(12) United States Patent
VanLandingham et al.

(10) Patent No.: US 8,579,537 B2
(45) Date of Patent: Nov. 12, 2013

(54) COUPLING ARRANGEMENT

(75) Inventors: Wayne M. VanLandingham, Texarkana, TX (US); Thomas G. Glore, Texarkana, AR (US)

(73) Assignee: Husqvarna Consumer Outdoor Products N.A., Inc., Charlotte, NC (US)

( * ) Notice: Subject to any disclaimer, the term of this patent is extended or adjusted under 35 U.S.C. 154(b) by 761 days.

(21) Appl. No.: 11/428,668

(22) Filed: Jul. 5, 2006

(65) Prior Publication Data

US 2008/0008522 A1    Jan. 10, 2008

(51) Int. Cl.
*F16L 23/00* (2006.01)

(52) U.S. Cl.
USPC ..... 403/341; 403/DIG. 14; 15/145; 15/176.6; 16/405; 16/427; 16/429

(58) Field of Classification Search
USPC ............. 285/789, 92, 319, 921, 7; 403/341; 16/405, 427, 429; 15/144.3, 144.4, 15/145, 176.1, 176.2, 176.6
See application file for complete search history.

(56) References Cited

U.S. PATENT DOCUMENTS

| | | | |
|---|---|---|---|
| 573,695 A | 12/1896 | Penfield | |
| 637,000 A | 11/1899 | Johnson | |
| 726,047 A | 4/1903 | Graham | |
| 1,390,564 A * | 9/1921 | Knorr | 285/243 |
| 2,483,396 A | 10/1949 | Benson | |
| 3,380,097 A | 4/1968 | Pharris | |
| 4,105,346 A | 8/1978 | Gelinas | |
| 4,397,088 A | 8/1983 | Hampel | |
| 4,463,498 A | 8/1984 | Everts | |
| 4,505,040 A | 3/1985 | Everts | |
| 4,642,837 A | 2/1987 | Nichols et al. | |
| 4,922,577 A | 5/1990 | Unger | |
| 4,953,640 A * | 9/1990 | Kurt | 175/320 |
| 5,263,303 A * | 11/1993 | Stroud | 56/12.7 |
| 5,339,916 A * | 8/1994 | Louis | 180/19.3 |
| 5,421,060 A | 6/1995 | Miller et al. | |
| 5,425,225 A * | 6/1995 | Franco | 56/332 |
| 5,642,569 A * | 7/1997 | Palmer | 33/809 |
| 5,983,455 A | 11/1999 | Polzin et al. | |
| 6,056,326 A * | 5/2000 | Guest | 285/81 |
| 6,155,610 A * | 12/2000 | Godeau et al. | 285/242 |
| 6,442,793 B1 * | 9/2002 | Paterson et al. | 15/410 |
| 6,513,191 B1 * | 2/2003 | Kim | 15/414 |
| 6,520,192 B1 | 2/2003 | Lo | |
| 6,698,962 B2 | 3/2004 | Wang | |
| 6,860,672 B2 * | 3/2005 | Kim | 403/314 |
| 6,886,865 B2 * | 5/2005 | Jung | 285/7 |
| 7,004,671 B2 * | 2/2006 | Tawara et al. | 403/341 |
| 7,025,383 B2 | 4/2006 | Canale | 285/7 |
| 7,357,425 B2 * | 4/2008 | Werth | 285/242 |
| 7,425,022 B2 * | 9/2008 | Guest | 285/322 |
| 2003/0123926 A1 | 7/2003 | Lin | |

* cited by examiner

*Primary Examiner* — Gregory Binda
*Assistant Examiner* — Nahid Amiri
(74) *Attorney, Agent, or Firm* — Nelson Mullins Riley & Scarborough LLP

(57) ABSTRACT

An arrangement for coupling together end-to-end segmented sections of an elongated member can be used with an elongated apparatus that is broken down into the segmented sections for the purpose of conveniently packaging the elongated apparatus in cardboard cartons and the like. The coupling arrangement is used to join the segmented sections when the tool is removed from the carton. The coupling arrangement can include a locking feature that prevents the segmented sections from being separated from one another after they have been joined by the coupling arrangement.

14 Claims, 5 Drawing Sheets

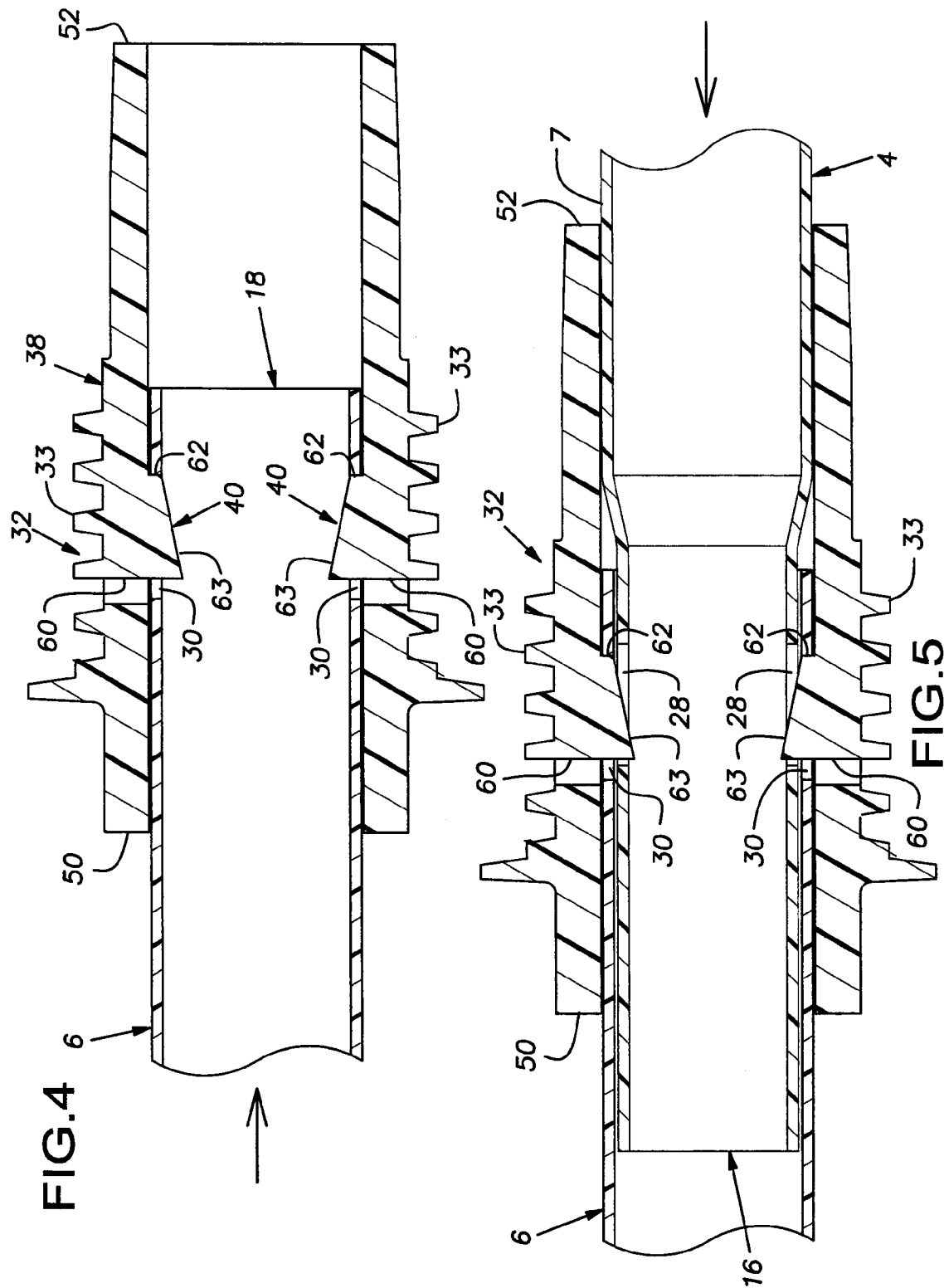

COUPLING ARRANGEMENT

BACKGROUND OF THE INVENTION

The present invention has to do in general with an arrangement for coupling together end-to-end segmented sections of an elongated member, and, in particular, the present invention concerns a coupling arrangement that can be used to couple together two or more segmented sections of an elongated apparatus that is broken down into the segmented sections for the purpose of conveniently packaging the elongated apparatus in cardboard cartons and the like.

Available coupling arrangements for joining end-to-end segmented sections of elongated members are numerous. In addition, the purposes which such coupling arrangements serve are many and varied. For example, in many instances the coupling arrangement is provided for the purpose of extending the reach of a tool or device such as cleaning tools, painting rollers and agricultural and landscaping equipment.

In some cases, tools and devices in their normal condition of use are quite lengthy. As a result, the tools and devices can be unwieldy and can present problems in connection with their storage or their packaging in cardboard cartons and the like of a convenient size. In such cases, it could be desirable to break down the tool or device into two or more segmented sections that can be assembled using a coupling arrangement.

SUMMARY OF THE INVENTION

According to one aspect, the invention comprises an arrangement for coupling together two or more segmented sections of an elongated tool such as a string trimmer for example so that the trimmer initially may be broken down into two or more segmented sections for the purpose of conveniently packaging the trimmer in a cardboard carton or the like and the coupling arrangement used to join the segmented sections when the tool is removed from the carton.

According to another aspect, the coupling arrangement includes a locking component that prevents the segmented sections from being separated from one another after they have been joined by the coupling arrangement.

According to further aspect, an arrangement is provided for coupling together end-to-end a male end of a first segmented section of an elongated member and a female end of a second segmented section of the elongated member The male end of the first segmented section comprises an outer wall and a hollow space within the outer wall at which is located at least one first locking element, and the female end of the second segmented section comprises an outer wall and a hollow space within the outer wall at which is located at least one second locking element. The male end of the first segmented section is adapted to be inserted within the hollow space of the female end of the second segmented section. A sleeve having an outer surface and an inner surface and at least one latching element located at least partially at the inner surface of the sleeve is adapted to at least substantially encircle the male end of the first segmented section and the female end of the second segmented section when the male end of the first segmented section is inserted within the hollow space of the female end of the second segmented section so that the at least one latching element of the sleeve engages and locks onto the at least one first locking element located in the male end of the first segmented section and the at least one second locking element located in the female end of the second segmented section. As a result, the sleeve, the first segmented section and the second segmented section are locked together and the male end of the first segmented section is prevented from being withdrawn from the female end of the second segmented section.

According to yet another aspect, a retaining member is adapted to be affixed to the sleeve and the at least one latching element for preventing the at least one latching member from becoming disengaged from the at least one first locking element located in the male end of the first segmented section and the at least one second locking element located in the female end of the second segmented section.

According to still another aspect, the present invention concerns a method of coupling together end-to-end a first segmented section and a second segmented section of an elongated member by joining a male end of the first segmented section to a female end of the second segmented section. The male end of the first segmented section comprises an outer wall and a hollow space within the outer wall in which is located at least one first locking element and the female end of the second segmented section comprises an outer wall and a hollow space within the outer wall in which is located at least one second locking element. The method comprises providing a sleeve having a second end into which the female end of the second segmented section is to be inserted and a first end into which the male end of the first segmented section is to be inserted, the sleeve having an inner surface and an outer surface and at least one latching element located at least partially at the inner surface of the sleeve. The female end of the second segmented section is inserted into the second end of the sleeve until the at least one second locking element in the female end of the second segmented section locks onto the at least one latching element of the sleeve. The male end of the first segmented section is inserted into the first end of the sleeve and into the hollow space in the female end of the second segmented section until the at least one first locking element in the first segmented section locks onto the at least one latching element of the sleeve. This results in the locking together of the sleeve, the first segmented section and the second segmented section and the inability of the male end of the first segmented section to be withdrawn from the female end of the second segmented section. Also, a retaining member can be affixed to the sleeve and the at least one latching element so as to prevent the at least one latching member from becoming disengaged from the at least one first locking element located in the male end of the first segmented section and the at least one second locking element located in the female end of second segmented section.

BRIEF DESCRIPTION OF THE DRAWINGS

FIG. 4 is a cross-sectional view of an embodiment of the coupling arrangement of the invention shown in a stage of assembly subsequent to the stage of assembly illustrated in FIG. 3.

FIG. 5 is a cross-sectional view of an embodiment of the coupling arrangement of the invention shown in a stage of assembly subsequent to the stage of assembly illustrated in FIG. 4.

FIG. 7 is a perspective view of an embodiment of the coupling arrangement of the invention following the completed assembly of the coupling arrangement.

DETAILED DESCRIPTION OF AN EMBODIMENT OF THE INVENTION

The detailed description of an embodiment of the invention that follows refers to the application of the invention to a string trimmer employed in performing landscaping work. In addition, the description discusses the use of the invention for the purpose of breaking down the elongated handle of the string trimmer into two or more segmented sections for the purpose of being able to package the trimmer in a conveniently sized packing carton. However, as will be understood by those having ordinary skill in the art, the invention has application in a variety of instances where it is desired to join together end-to-end segmented sections of an elongated tool or device and in cases where the elongated member is broken down for purposes other than the convenient packaging of the elongated member. For example, the invention can be used with various long-handled agricultural and landscaping equipment such as cultivators and long-handled pruning saws and shears, long-handled painting rollers and long-handled cleaning tools such as brooms and mops.

Figure 1:
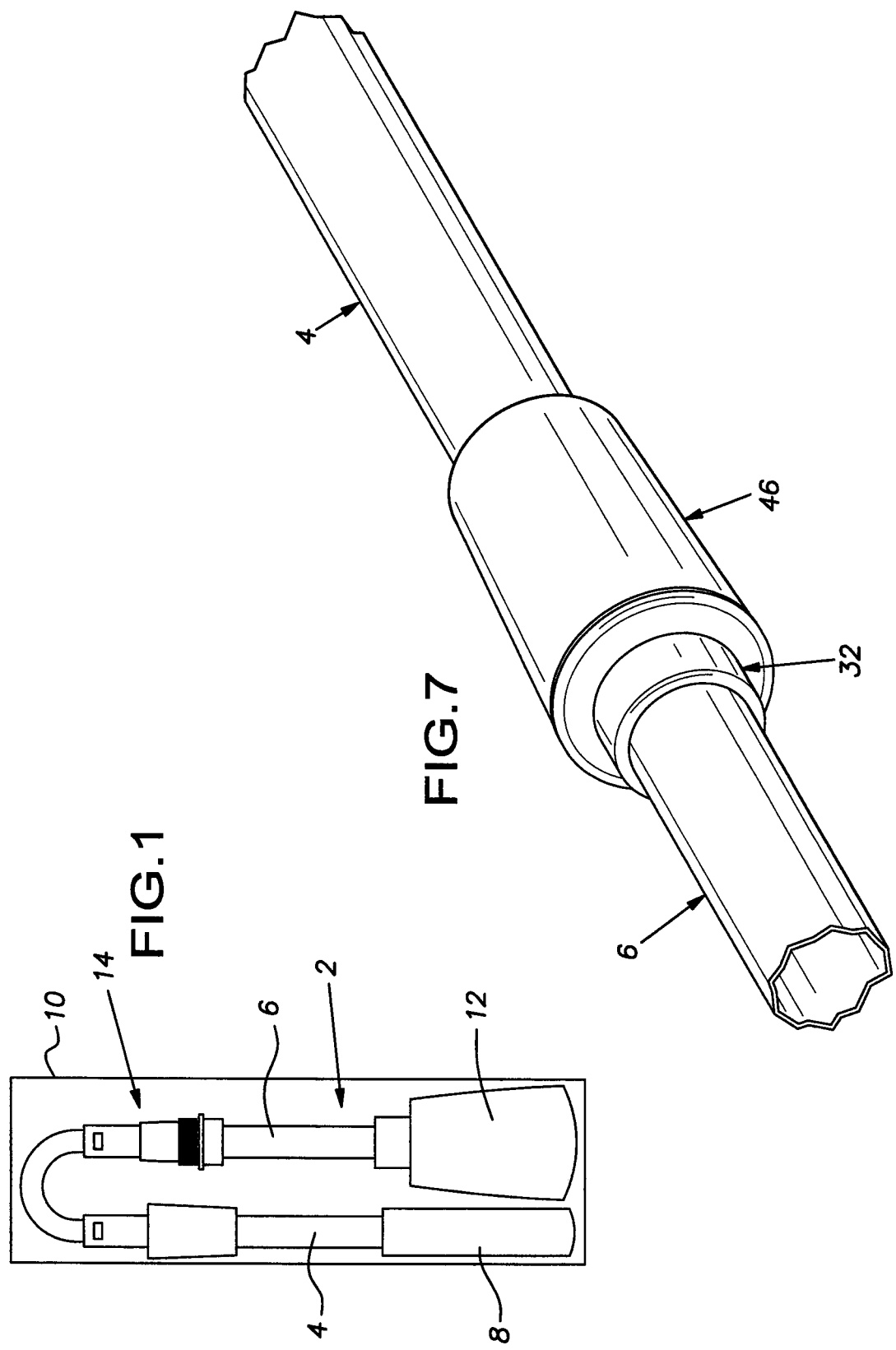
FIG. 1 is a front elevational schematic representation that illustrates the application of an embodiment of the coupling arrangement of the invention to a string trimmer for the purpose breaking down the trimmer so that it may be more conveniently packaged.

Referring first to FIG. 1, a string trimmer, indicated generally at 2, is shown broken down into a first or upper segmented section 4 and a second or lower segmented section 6 and packaged in a cardboard carton 10. A handle with a switch for an electric motor 8 is mounted at one end of the upper segmented section 4 and a cutting head with a power source such as an electric motor 12 is mounted at one end of the lower segmented section 6. The string trimmer can be used with power sources other than an electric motor. A fuel-driven engine, which would be mounted at the end of the upper segmented section 4 where the handle 8 is otherwise located, can also be employed for example.

A coupling arrangement, indicated generally at 14, is provided where the segmented sections 4 and 6 are separated for joining together end-to-end the segmented sections when the string trimmer is removed from the carton 10. The coupling arrangement can be made of any suitable material such as metal or plastic for example. In the embodiment of the invention shown in the drawings, the first segmented section 4 and the second segmented section 6 comprise substantially cylindrical tubular structures. As will be understood by those having ordinary skill in the art, by breaking down the string trimmer into two segmented sections, the string trimmer can be packaged in a more compact carton that is more convenient to handle and store at a retail establishment than would be the case if the string trimmer were not broken down.

Figure 2:
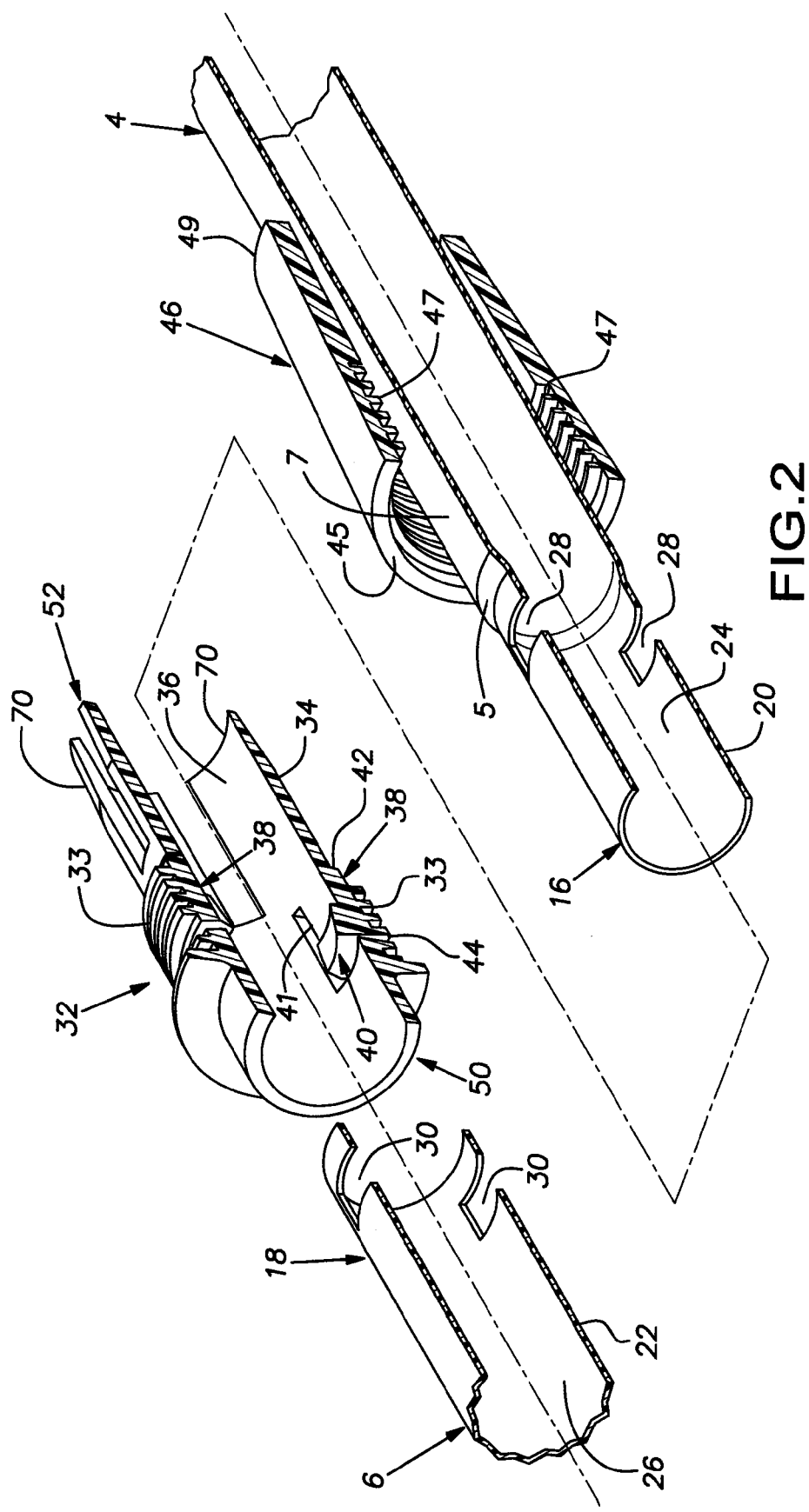
FIG. 2 is an exploded cross-sectional perspective view of an embodiment of the coupling arrangement of the invention.

For a detailed description of the coupling arrangement 14 reference is now made to FIGS. 2 through 6. FIG. 2 depicts the coupling arrangement, including the segmented sections 4 and 6 of the trimmer, prior to the assembly of the coupling arrangement. In general, the present invention provides an arrangement for coupling together end-to-end a male end 16 of the first segmented section 4 of an elongated member and a female end 18 of the second segmented section 6 of the elongated member. Each segmented section 4 and 6 has a free end opposite the segmented section's respective female end and male end. As indicated above, a cutting head and power source 12 of a line trimmer are mounted at the second end of the second segmented section 6 and a handle with a switch 8 for the power source is mounted at the second end of the first segmented section 4. The male end 16 of the first segmented section is joined by shoulder 5 to a main portion 7 of the first segmented section 4. The diameter of the main portion 7 is larger than the diameter of the male end 16.

The male end 16 of the first or upper segmented section 4 comprises an outer wall 20 and a hollow space 24 enclosed by the outer wall at which is located at least one first locking element 28. In other words, the hollow space 24 is the interior space of the first segmented section 4. The female end 18 of the second segmented section 6 comprises an outer wall 22 and a hollow space 26 enclosed by the outer wall at which is located at least one second locking element 30. In other words, the hollow space 26 is the interior space of the second segmented section 6. In the embodiment illustrated in the drawings, the at least one first locking element 28 in the male end 16 of the first segmented section 4 comprises surfaces on the first segmented section that provide a first opening that extends through the outer wall 20 of the male end 16 of the first segmented section 4. Also, the at least one second locking member 30 in the female end 18 of the second or lower segmented section 6 comprises surfaces on the second segmented section that provide a second opening that extends through the outer wall 22 of the female end 18 of the second segmented section 6. In the illustrated embodiment, the male end 16 of the first segmented section 4 includes two first locking elements or first openings 28 that are located substantially diametrically opposite one another and the female end 18 of the segmented section 6 includes two second locking elements or second openings 30 that are located substantially diametrically opposite one another. As described in greater detail below, the male end 16 of the first segmented section 4 is adapted to be inserted, as shown by the directional arrowhead in FIG. 5 extending along the axis, within the hollow space 26 of the female end 18 of the second segmented section 6 and the first openings 28 are in substantial registration with respective second openings 30 when the coupling arrangement is assembled.

The coupling arrangement of the invention also includes a sleeve indicated generally at 32 as best seen in FIG. 2. The sleeve has an outer surface 34 and an inner surface 36 and at least one latching element indicated generally at 38. The latching element 38 is located at least partially at the inner surface 36 of the sleeve 32. As is described in greater detail below, the sleeve 32 is adapted to at least substantially encircle the male end 18 of the first segmented section 6 and the female end 16 of the second segmented section 4 when the male end of the first segmented section is inserted within the hollow space 26 of the female end of the second segmented section. In that configuration, the first opening or locking element 28 in the male end 16 of the first segmented section 4 and the second opening or locking element 30 in the male end 18 of the second segmented section 6 are in substantial registration with one another and the at least one latching element 38 of the sleeve 32 engages and locks onto at least one aperture 29 defined by the boundaries of the at least one first locking element 28 and the at least one second locking element 30. As will become more apparent from the description below, with the first segmented section 4 and the second segmented section 6 in such a relationship with the sleeve 32, the sleeve, the first segmented section and the second segmented section are locked together and the male end of the first segmented section is prevented from being withdrawn from the female end of the second segmented section. In particular, the first segmented section 4, the second segmented section 6 and the sleeve 32 have cooperating surfaces that provide for the locking together of the first segmented section and the second segmented section. As should be appreciated at this point and as will become more apparent from the description below, such cooperating surfaces of the first segmented section 4, the second segmented section 6 and the sleeve 32 provide cooperating surface means for causing the locking for preventing the male end of the first segmented section from being withdrawn from the female end of the second segmented section.

As shown in FIG. 2, the at least one latching element 38 has a projecting portion, indicated generally at 40, that projects from the inner surface 36 of the sleeve inwardly of the inner surface of the sleeve. The latching element 38 is attached at one end 42 to the sleeve 32 but is separated from the sleeve at end 44 of the latching element. As a consequence, the projecting portion 40 of the at least one latching element 44 is movable from the inner surface 36 of the sleeve toward the outer surface 34 of the sleeve. By means of the slot 41 that is cut into the sleeve 32, additional flexibility is imparted to the projecting portion 40 of the latching element 38 so that the projecting portion can move outwardly.

When the at least one latching element 38 engages and locks onto the at least one, aperture 29, the projecting portion 40 of the at least one latching element projects through the first opening 28 in the outer wall 20 of the male end 16 of the first segmented section 4 and through the second opening 30 in the outer wall 22 of the female end 18 of the second segmented section 6. In this way, the sleeve 32, the first segmented section 4 and the second segmented section are locked together.

In the embodiment of the invention illustrated in the drawings, the sleeve 32 includes two latching elements 38 located substantially diametrically opposite one another. Each of the first locking elements or first openings 28 in the male end 16 of the first segmented section 4 and each of the second locking elements 30 in the female end 18 of the second segmented section 6 are engaged by a respective latching element 38 when the coupling arrangement is assembled.

The coupling arrangement of the invention also can include a retaining member 46, as best seen in FIG. 2, that is adapted to be affixed to the sleeve 32 and the at least one latching element 38. By affixing the retaining member 46 to the sleeve 32 and the at least one latching element 38, the at least one latching element is prevented from becoming disengaged from the at least one first locking element 28 located in the male end 16 of the first segmented section 4 and the at least one second locking element 30 located in the female end 18 of the second segmented section 6.

In the embodiment shown in FIG. 2, the outer surface 34 of the sleeve 32 includes fastening threads 33 and the retaining member 46 is provided with complementary fastening threads 47 by means of which the retaining member is affixed to the sleeve when the sleeve 32, the first segmented section 4 and the second segmented section 6 are locked together. In that configuration, the retaining member 46 engages the at least one latching element 38 so as to prevent the latching element from being disengaged from the at least one aperture 29. As shown in FIG. 2, the sleeve and the retaining member can comprise hollow tubular structures, the fastening threads 33 on the sleeve can comprise male fastening threads and the fastening threads 47 on the retaining member can be located internally of the retaining member and comprise female fastening threads.

Figure 3:
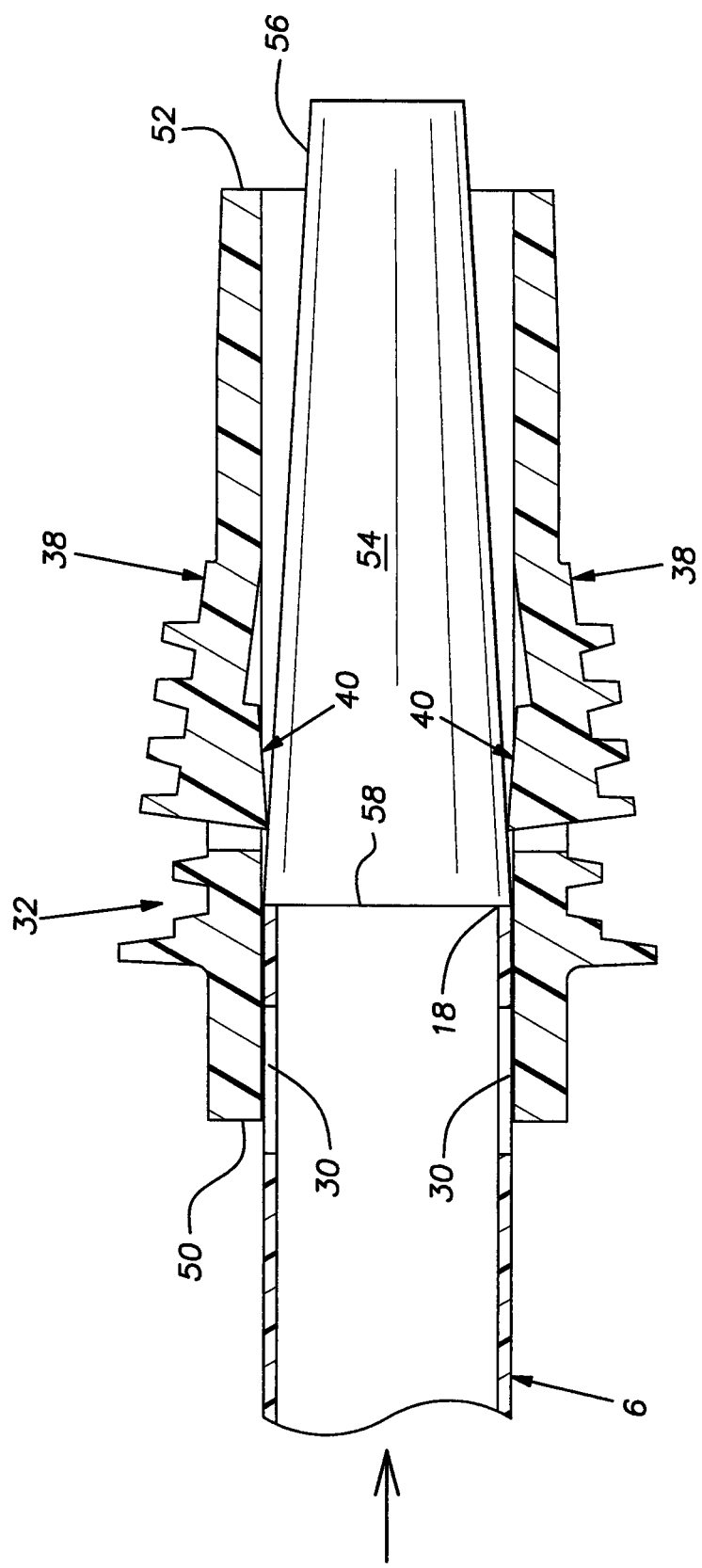
FIG. 3 is a cross-sectional view of an embodiment of the coupling arrangement of the invention shown in an initial stage of assembly.

Reference will now be had to FIGS. 3 through 7 for a description of the manner in which the coupling arrangement of the invention can be assembled according to one embodiment pursuant to which description the features of the invention will be further delineated. An initial stage of the assembly of the coupling arrangement is shown in FIG. 3 where the sleeve 32 is shown as having a second end 50 into which the female or second end 18 of the second segmented section 6 is to be inserted and a first end 52 into which the male or first end 16 of the first segmented section 4 is to be inserted. The female end 18 of the second segmented section 6 is first inserted into the second end 50 of the sleeve 32 until the at least one second locking element 30 in the female end 18 of the second segmented section 6 locks onto the at least one latching element 38 of the sleeve 32.

As can be seen from FIG. 3, it would not be possible to insert the female end 18 into the sleeve a sufficient distance to have the locking elements 30 in the female end 18 engage and lock onto latching elements 38 of the sleeve without first causing the projecting portion 40 of the latching elements to move outwardly of the inner surface 36 of the sleeve 32. Accordingly, an assembling tool 54 is first inserted into the second end 50 of the sleeve. The forward end 56 of the tool is tapered and of a smaller diameter than the interior of the sleeve. The rearward end 58 of the tool 54 on the other hand has an outside diameter substantially equal to the diameter of the interior of the sleeve. Consequently, as the tool 54 is inserted further into the interior of the sleeve 32, the outside of the tool will come into contact with the projecting portions 40 of the latching elements 38 and cause the projecting portions to be essentially completely displaced from the interior of the sleeve. At the same time, the female end 18 of the second segmented section 6 is placed in an abutting relationship with the rearward end 58 of the assembling tool 54 and both the tool and the second segmented section are advanced into the interior of the sleeve until the openings 30 are located above the projecting portions 40 of the latching elements 38 at which time the projecting portions will spring inwardly of the inner surface 36 of the sleeve 32 through the openings 30 so as to lock the second segmented section 6 to the sleeve.

FIG. 4 illustrates the configuration of the sleeve 32 and the female end 18 of the second segmented section 6 when they are locked together. As shown there, the projecting portions 40 of the latching members 38 are positioned in the openings 30 thereby preventing the female end 18 of the second segmented section 6 from being withdrawn from or advanced into the sleeve.

Normally, this initial assembling step will be performed at the facility where the trimmer is manufactured. One reason the assembling of the coupling arrangement is carried out in this way is so that no special tool will be required by the purchaser of the trimmer to completely assemble the coupling arrangement as will be apparent from the description of the complete assembling procedure that follows. For this purpose, it will also normally be the case that the retaining member 46 will be placed over the first segmented section 4. With the first segmented section and the second segmented section still uncoupled, the trimmer is packaged in a carton for distribution as illustrated in FIG. 1.

When it is desired to remove the trimmer from the packaging carton and completely assemble the coupling arrangement, the required remaining assembling steps are straight forward. Referring to FIG. 5, the male end 16 of the first segmented section 4 is inserted into the first end 52 of the sleeve 32 and into the hollow space 26 in the female end 18 of the second segmented section 6 until the at least one first locking element 28 locks onto the at least one latching element 38 of the sleeve 32 whereby the sleeve 32, the first segmented section 4 and the second segmented section 6 are locked together and the male end 16 of the first segmented section 4 is prevented from being withdrawn from the female end 18 of the second segmented section 6.

At this point, it may be noted that the projecting portion 40 of the at least one latching element 38 and the at least one opening 28 in the male end 16 of the first segmented section 4, and the at least one latching element 38 and the at least one opening 30 in the female end 18 of the second segmented section 6, include complementary engaging surfaces that prevent the first segmented section 4 from being withdrawn from the second segmented section 6 when the sleeve 32, the first segmented section 4 and the second segmented section 6 are locked together. More specifically, with respect to the embodiment of the invention shown in the drawings, and as best seen in FIGS. 4 and 5, the projecting portion 40 of each latching element includes a first surface 60 that is substantially at a right angle to the direction in which the male end 16 of the first segmented section 4 is inserted into the female end 18 of the second segmented section 6. Each latching element also includes a second surface 62 that is substantially at a right angle to the direction in which the male end 16 of the first segmented section 4 is inserted into the female end 18 of the second segmented section 6. A third surface 63 connects the first and second surfaces 60 and 62 with the first surface 60 being located nearer the second end of the second segmented section 6 than the second surface 62 and the first surface 60 projecting into the sleeve further than the second surface. This results in the third surface 63 sloping downwardly from the first surface 60 to the second surface 62. Consequently, the male end 16 of the first segmented section 4, when it is inserted into the first end 52 of the sleeve and the female end 18 of the second segmented section 6 as shown by the arrowhead in FIG. 5, is able to ride over the projecting portion 40 of the latching element 38 and force the projecting portion outwardly of the inner surface of the sleeve until the at least one first opening 28 in the outer wall 20 of the male end 16 of the first segmented section 4 is substantially in registration with the at least one second opening 30 in the outer wall of the female end 18 of the second segmented section 6, whereupon the projecting portion 40 moves inwardly of the inner surface of the sleeve into the at least one first opening 28 in the outer wall of the male end of the first segmented section. Thus, the sloping third surface discussed above can be part of the example of cooperating surface means that cooperate toward the goal of achieving the insertion and the locked status via only forces being applied aligned along the shown arrowhead of FIG. 5. Moreover, it is easily appreciated that the only required forces that need to be applied by the assembler in order to accomplish insertion are aligned along the shown arrowhead of FIG. 5, with the arrowhead being along the axis or axial direction.

It is also to be noted that the insertion of the male end 16 of the first segmented section 6 can be facilitated by having the surface 62 of the projecting portion 40 project above the inner surface 36 of the sleeve 32 a distance equal to the thickness of the wall 22 of the female end 18 of the second segmented section 6. With this construction, the top of the surface 62 will be substantially flush with interior surface 26 of the female end 18 of the second segmented section 6 as shown in FIG. 4. Consequently, the male end 16 of the first segmented section 4 is less likely to be hung up on surface 62 when the male end is inserted in to the female end 18 of the second segmented section 6.

As best seen in FIGS. 4 and 5, the complementary engaging surfaces that prevent the first segmented section 4 from being withdrawn from the second segmented section 6 when the sleeve 32, the first segmented section 4 and the second segmented section 6 are locked together comprise the first surface 60 and an edge of the at least one first opening 28 in the outer wall 20 of the male end 16 of the first segmented section 4 and the second surface 62 and an edge of the at least one second opening 30 in the outer wall 22 of the female end 18 of the second segmented section 6. Thus, the complementary engaging surfaces discussed above can be part of the example of cooperating surface means for causing the at least one latching element of the sleeve to engage and lock onto the at least one aperture during application of required forces and for preventing the male end of the first segmented section from being withdrawn from the female end of the second segmented section.

Figure 6:
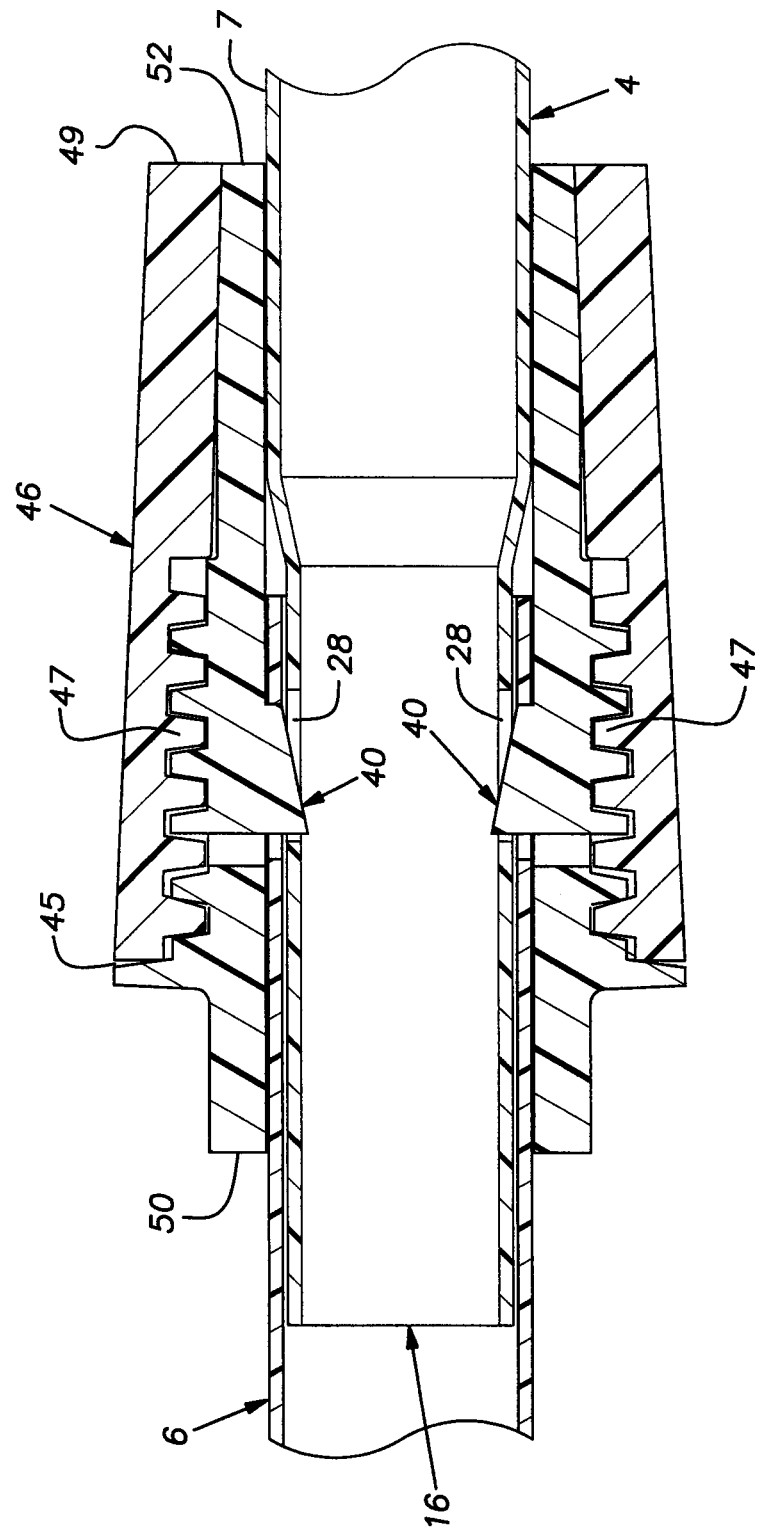
FIG. 6 is a cross-sectional view of an embodiment of the coupling arrangement of the invention shown in a completed stage of assembly.

The assembly of the coupling arrangement is completed by affixing the retaining member or nut 46 to the sleeve 32. This is accomplished in the embodiment illustrated in the drawings by screwing the fastening threads 47 of the retaining member to the fastening threads 33 of the sleeve 32. The configuration of the complete assembly of the coupling arrangement is shown in FIG. 7 and a cross-sectional view through the complete assembly is shown in FIG. 6. As best seen in FIGS. 2, 5 and 6, the portion of the sleeve 32 that is adjacent the end 52 of the sleeve is separated into several flexible finger-like elements 70. The inner surface of the elements 70 are substantially in contact with the outer surface of the main portion 7 of the first segmented section 4 as shown in FIG. 5. At the same time, both the outside diameter and the inside diameter of the retaining member 46 are incrementally smaller in the direction from a first end 45 to a second end 49 of the retaining member. As a result, when the retaining member 46 is screwed to the sleeve 32, the inner surface of the retaining member adjacent the end 49 of the retaining member will engage and compress the finger-like projections 70 of the sleeve 32 and force the projections into intimate contact with the outer surface of the portion 7 of the first segmented section 4 as illustrated in FIG. 6. This provides an additional holding effect between the components of the coupling arrangement. In this connection, the portion of the sleeve 32 that is separated into the finger-like elements 70 can taper in thickness and be incrementally thinner towards the end 52 of the sleeve. This feature is best shown in FIG. 2, and it will be understood that the extent of the tapering can be more pronounced than shown in FIG. 2 and can be initiated nearer the threads 33 than illustrated in FIG. 2. Additionally, the portion of the retaining member 46 that is in contact with the sleeve 42 toward the end 49 of the retaining member can also be tapered and be incrementally thinner in a direction from the threads 47 of the retaining member toward the end 49 of the retaining member. By tapering the sleeve and the retaining member in this way, a better gripping force is applied to the portion 7 of the first segmented section 4 when the coupling arrangement is completely assembled.

Although a particular embodiment of the invention has been described in detail above, it will be understood that the invention is not limited to that embodiment but includes all changes and modifications that are within the literal and equivalent scope of the claims that follow.

What is claimed is:
1. An elongated member including:
  a first segmented section of the elongated member, the first segmented section being connected to one of a handle or a cutting head of an outdoor power equipment device, the first segmented section including a male end and a second end opposite the male end, the male end having an outer wall and a hollow space within the outer wall, the male end also having at least one first locking element;

a second segmented section of the elongated member, the second segmented section being connected to the other of the handle or the cutting head, the second segmented section including a female end and a second end opposite the female end, the female end having an outer wall and a hollow space within the outer wall, the female end also having at least one second locking element, the male end of the first segmented section being adapted to be inserted within the hollow space of the female end of the second segmented section;

a sleeve, the sleeve having an outer surface and an inner surface and at least one latching element located at least partially at the inner surface of the sleeve, the sleeve being carried on the first segmented section, the sleeve at least substantially encircles the male end of the first segmented section and the female end of the second segmented section when the male end of the first segmented section is inserted within the hollow space of the female end of the second segmented section so that the at least one latching element of the sleeve engages and locks onto an at least one aperture defined by the boundaries of the at least one first locking element located in the male end of the first segmented section and the at least one second locking element located in the female end of the second segmented section, and the first segmented section, the at least one latching element including a first surface, a second surface and a third surface, the third surface connecting the first and second surfaces, the first and second surfaces being substantially parallel to each other and substantially perpendicular to a direction in which the male end of the first segmented section is inserted into the female end of the second segmented section, the first surface contacting a corresponding surface of both the at least one first locking element and the at least one second locking element, and the second surface contacting only a corresponding surface of the at least one second locking element to cause the at least one latching element of the sleeve to engage and lock onto the at least one aperture during application of required forces and for preventing the male end of the first segmented section from being withdrawn from the female end of the second segmented section; and a retaining member removably affixed to the sleeve and the at least one latching element for preventing the at least one latching element from becoming disengaged from the at least one first locking element located in the male end of the first segmented section and the at least one second locking element located in the female end of the second segmented section.

2. The elongated member of claim 1 wherein the at least one first locking element in the male end of the first segmented section comprises a first opening that extends through the outer wall of the male end of the first segmented section and the at least one second locking element in the female end of the second segmented section comprises a second opening that extends through the outer wall of the female end of the second segmented section, and the first opening and the second opening are in substantial registration with one another when the sleeve, the first segmented section and the second segmented section are locked together.

3. The elongated member of claim 2 wherein the at least one latching element has a projecting portion that projects from the inner surface of the sleeve inwardly of the inner surface of the sleeve and is movable from the inner surface of the sleeve toward the outer surface of the sleeve, the projecting portion of the at least one latching element projecting through the first opening in the outer wall of the male end of the first segmented section and through the second opening in the outer wall of the female end of the second segmented section when the sleeve, the first segmented section and the second segmented section, locking the sleeve, the first segmented section and the second segmented section together.

4. The elongated member of claim 3 wherein the outer surface of the sleeve includes fastening threads and a retaining member is provided with complementary fastening threads by means of which the retaining member is affixed to the sleeve when the sleeve, the first segmented section and the second segmented section are locked together, the retaining member engaging the at least one latching element so as to prevent the at least one latching element from being disengaged from the at least one first locking element in the male end of the first segmented section and the at least one second locking element in the female end of the second segmented section.

5. The elongated member of claim 4 wherein the first segmented section and the second segmented section comprise substantially cylindrical tubular structures.

6. The elongated member of claim 5 wherein the sleeve and the retaining member comprise hollow tubular structures, the fastening threads on the sleeve comprise male fastening threads and the fastening threads on the retaining member are located internally of the retaining member and comprise female fastening threads.

7. The elongated member of claim 6 wherein the sleeve includes two latching elements located substantially diametrically opposite one another, the male end of the first segmented section includes two first locking elements located substantially diametrically opposite one another with each of the first locking elements being engaged by a respective one of the two latching element, and the female end of the second segmented section includes two second locking elements located substantially diametrically opposite one another with each of the second locking elements being engaged by a respective one of the two latching element.

8. The elongated member of claim 4 wherein the projecting portion of the at least one latching element and the at least one opening in the male end of the first segmented section, and the at least one latching element and the at least one opening in the female end of the second segmented section, include complementary engaging surfaces that prevent the first segmented section from being withdrawn from the second segmented section when the sleeve, the first segmented section and the second segmented section are locked together.

9. The elongated member of claim 8 wherein the projecting portion of the at least one latching element includes the first surface that is substantially at a right angle to the direction in which the male end of the first segmented section is inserted into the female end of the second segmented section, the second surface that is substantially at a right angle to the direction in which the male end of the first segmented section is inserted into the female end of the second segmented section, and the third surface that connects the first and second surfaces, the first surface being located nearer the second end of the second segmented section than the second surface and the first surface projecting into the sleeve further than the second surface, whereby the third surface slopes downwardly from the first surface to the second surface so as to enable the male end of the first segmented section, when the male end of the first segmented section is inserted into the female end of the second segmented section, to ride over the projecting portion and force the projecting portion outwardly of the sleeve until the at least one first opening in the outer wall of the male end of the first segmented section is substantially in registration with the at least one second opening in the outer wall of the female end of the second segmented section whereupon the projecting portion moves inwardly of the inner surface of the sleeve into the at least one first opening in the outer wall of the male end of the first segmented section.

10. The elongated member of claim 9 wherein the complementary engaging surfaces comprise the first surface of the projecting portion of the at least one latching element and an edge of the at least one first opening in the outer wall of the male end of the first segmented section, and the second surface of the projecting portion of the at least one latching element and an edge of the at least one second opening in the outer wall of the female end of the second segmented section.

11. The elongated member of claim 5 wherein a cutting head and power source of a line trimmer are mounted at the second end of the second segmented section and a handle with a switch for the power source is mounted at the second end of the first segmented section.

12. An elongated member including:
a first segmented section of the elongated member, the first segmented section being connected to one of a handle or a cutting head of an outdoor power equipment device, the first segmented section including a male end and a second end opposite the male end, the male end having an outer wall and a hollow space within the outer wall, the male end also having at least one opening extending through the outer wall of the male end;
a second segmented section of the elongated member, the second segmented section being connected to the other of the handle or the cutting head, the second segmented section including a female end and a second end opposite the female end, the female end having an outer wall and a hollow space within the outer wall, the female end also having at least one opening extending through the outer wall of the female end, the male end of the first segmented section being adapted to be inserted within the hollow space of the female end of the second segmented section so that the at least one opening in the outer wall of the female end of the second segmented section and the at least one opening in the outer wall of the male end of the first segmented section are in substantial registration with one another; and
a sleeve, the sleeve having an outer surface and an inner surface and at least one latching element having a projecting portion that projects from the inner surface of the sleeve inwardly of the inner surface of the sleeve and is movable from the inner surface of the sleeve toward the outer surface of the sleeve, the sleeve substantially encircles the male end of the first segmented section and the female end of the second segmented section so that the projecting portion of the at least one latching member projects through an at least one aperture defined by the boundaries of the at least one opening in the outer wall of the male end of the first segmented section and the at least one opening in the outer wall of the female end of the second segmented section the first segmented section, the projecting portion including a first surface, a second surface and a third surface, the third surface connecting the first and second surfaces, the first and second surfaces being substantially parallel to each other and substantially perpendicular to a direction in which the male end of the first segmented section is inserted into the female end of the second segmented section, the first surface contacting a corresponding surface of both the at least one opening in the outer wall of the female end of the second segmented section and the at least one opening in the outer wall of the male end of the first segmented section, and the second surface contacting only a corresponding surface of the at least one opening in the outer wall of the female end of the second segmented section to cause the at least one latching element of the sleeve to engage and lock onto the at least one aperture during application of required forces only in an axial direction and for preventing the male end of the first segmented section from being withdrawn from the female end of the second segmented section, the outer surface of the sleeve including fastening threads overlying and in contact with the projecting portion of the at least one latching element; and
a retaining member, the retaining member having fastening threads by means of which the retaining member is affixed to the fastening threads at the outer surface of the sleeve whereby the at least one latching element is restrained from being displaced outwardly of the inner surface of the sleeve from the at least one opening in the wall of the male end of the first segmented section and the at least one opening in the wall of the female end of the second segmented section when the male end of the first segmented section is inserted within the hollow space in the female end of the second segmented section and the at least one opening in the outer wall of the female end of the second segmented section and the at least one opening in the outer wall of the male end of the first segmented section are in substantial registration with one another.

13. The elongated member of claim 1, wherein the sleeve includes a plurality of latching elements.

14. The elongated member of claim 12, wherein the sleeve includes a plurality of latching elements.

* * * * *